UNITED STATES PATENT OFFICE 2,201,074

UNSATURATED ETHERS AND METHOD OF MAKING SAME

Edgar C. Britton and Harold R. Slagh, Midland, Mich., assignors to The Dow Chemical Company, Midland, Mich., a corporation of Michigan No Drawing. Application January 28, 1939, Serial No. 253,381

13 Claims. (Cl. 260—615)

This invention concerns certain new unsaturated ethers and a method of making the same.

The new ethers herein disclosed have the general formula:

$$R-O-Y-O-Y'-O-R'$$

wherein R and R' each represents an allyl or 2-methyl-allyl radical and Y and Y' each represents an alkylene radical. The new ethers are in most instances colorless liquids. They may be reacted with polystyrene during polymerization of the latter to obtain resinous products which have physical properties, e. g. strength characteristics, solubility in benzene, moldability, etc., distinct from those of polystyrene alone prepared under like polymerizing conditions, but which retain to a considerable extent the excellent dielectric properties of polystyrene. The new unsaturated ethers may also be added in small proportion to carbon tetrachloride, ethylene chloride, propylene chloride, or other halogenated aliphatic hydrocarbon to inhibit the usual corrosive action of such halogenated compounds toward metal containers or other metal equipment. The ethers are also useful as chemical agents from which a variety of other organic products may be prepared.

The new unsaturated ethers are prepared by reacting a metal salt of allyl alcohol or of 2-methyl-allyl alcohol with a di-haloalkyl ether, e. g. di-chloromethyl ether, di-bromoethyl ether, di-alphachloro-ethyl ether, di-betachloro-ethyl ether, di-betabromo-ethyl ether, di-betachloro-isopropyl ether, betachloro-ethyl betachloro-propyl ether, etc. The alcoholate reactant is preferably an alkali metal, e. g. sodium or potassium, salt of allyl or 2-methyl-allyl alcohol, but other metal salts of these alcohols can be used, e. g. the calcium or aluminum alcoholates. Approximately two chemical equivalents or more of the alcoholate, e. g. between 1.8 and 3 mols of sodium allylate, is preferably employed per mol of the di-haloalkyl reactant, but the reactants may be used in other proportions, if desired.

The temperature at which the reaction occurs is dependent to some extent upon the particular reactants used. In some instances, particularly when using a di-bromalkyl ether as a reactant, it will occur at room temperature or only slightly above upon merely mixing the reactants. When using a di-chloroalkyl ether in the reaction, the latter usually occurs smoothly upon heating the mixture to temperatures between 50° and 125° C. The reaction may, of course, be carried out at even higher temperatures, e. g. at 150° C., under the pressure required to attain such temperature. However, it usually is advantageous to operate at the lowest temperature which will permit smooth and rapid reaction, since the alcohol reactant and/or the product is liable to undergo considerable decomposition or polymerization at the higher temperatures. The reaction is usually complete after from one-half to two hours of heating at temperatures between 90° and 110° C., but longer periods of reaction may sometimes be required, particularly at lower reaction temperatures.

As the reaction progresses, a metal halide is formed and usually precipitated from the mixture. After completing the reaction, the metal halide is preferably removed, e. g. by decantation or washing with water, and the ether product is separated by distillation.

The following examples describe a number of ways in which the principle of the invention has been applied, but are not to be construed as limiting the invention.

Example 1

Sodium allylate was prepared by heating 14 grams (0.61 gram atomic weight) of sodium with 116 grams of allyl alcohol at temperatures between 80° and 105° C. for 1 hour. The mixture was cooled to 50° C. and a solution of 29 grams (0.25 mol) of di-chloromethyl ether in 50 cubic centimeters of benzene was added gradually in 0.5 hour while maintaining the mixture at temperatures between 50° and 60° C. Sodium chloride precipitated from the mixture during the addition. After adding the di-chloromethyl ether, the temperature was raised to 80° C. for 0.5 hour. The mixture was then cooled, washed with water to remove the sodium chloride, and distilled under vacuum. There was obtained 31 grams (0.196 mol) of di-allyloxy dimethyl ether distilling at a temperature of approximately 66° C. at 8 millimeters pressure. The product is a clear colorless oil having a specific gravity of approximately 0.946 at 25°/25° C. and an index of refraction of about 1.472 at 25° C. It has the formula:

$$H_2C=CH-CH_2-O-CH_2-O-CH_2-O-CH_2-CH=CH_2$$

Example 2

Sodium 2-methyl-allylate was prepared by reacting 11.5 grams (0.5 gram atomic weight) of sodium with 128 grams of 2-methyl-allyl alcohol as in Example 1. A solution of 29 grams (0.25 mol) of di-chloromethyl ether in benzene was then added gradually in approximately 1 hour while heating the mixture at temperatures between 70° and 90° C. after which the temperature was raised to 100° C. for 1 hour. The mixture was then cooled and the sodium chloride formed by the reaction was removed by filtration. The mixture was then distilled to separate the di-2-methyl-allyloxy di-methyl ether product. The latter was obtained as a clear colorless liquid boiling at approximately 88°–91° C. at 10 millimeters pressure, having a specific gravity at 25°/25° C. of approximately 0.934 and an index of refraction at 25° C. or 1.435. It has the formula:

$$H_2C=\overset{CH_3}{\underset{|}{C}}-CH_2-O-CH_2-O-CH_2-O-CH_2-\overset{CH_3}{\underset{|}{C}}=CH_2$$

Example 3

Beta.beta'-di-(allyloxy) diethyl ether was prepared by reacting 0.5 gram mol of sodium allylate with 0.25 gram mol of beta.beta'-dichloro diethyl ether at temperatures between 100° and 110° C. and separating the product, as in Example 1. The product was a clear colorless liquid distilling at temperatures between 96° and 99° C. at 10 millimeters pressure, having a specific gravity at 25°/25° C. of approximately 0.950 and an index of refraction at 25° C. of approximately 1.442. It has the formula:

$$H_2C=CH-CH_2-O-CH_2CH_2-O-CH_2CH_2-O-CH_2-CH=CH_2$$

Example 4

Beta.beta'-di-(2-methyl-allyloxy) diethyl ether was prepared by reacting 0.5 gram mol of sodium 2-methyl-allylate with 0.25 gram mol of beta.beta'-dichloro diethyl ether at temperatures between 100° and 110° C. and then separating the product, as in Example 2. The product was a clear colorless liquid boiling at approximately 234°–238° C. at atmospheric pressure and having a specific gravity at 25°/25° C. of about 0.928 and an index of refraction at 25° C. of approximately 1.443. It has the formula:

$$H_2C=\overset{CH_3}{\underset{|}{C}}-CH_2-O-CH_2-CH_2-O-CH_2-CH_2-O-CH_2-\overset{CH_3}{\underset{|}{C}}=CH_2$$

Other di-allyloxy- and di-(2-methyl-allyloxy) dialkyl ethers may be made by the method illustrated in the foregoing specific examples. For instance, alpha.alpha'-di-allyloxy diethyl ether may be made by reacting sodium or potassium allylate with either alpha.alpha'-dichloro diethyl ether or alpha.alpha'-dibromo diethyl ether; alpha.alpha'-di-(2-methyl allyloxy) diethyl ether may be made by reacting sodium or potassium 2-methyl allylate with alpha.alpha'-dichloro diethyl ether or alpha.alpha'-dibromo diethyl ether; beta.beta'-di-allyloxy di-isopropyl ether may be made by reacting sodium allylate with beta.beta'-dichloro di-isopropyl ether; beta.beta'-di-(2-methyl allyloxy) di-isopropyl ether may be made by reacting sodium 2-methyl-allylate with beta.beta'-dichloro di-isopropyl ether; alpha.alpha'-dimethyl beta.beta'-di-allyloxy di-propyl ether by reacting sodium allylate with alpha.alpha'-dimethyl beta.beta'-dichloro di-propyl ether; etc. All such unsaturated ether products are adapted to the uses hereinbefore mentioned.

Other modes of applying the principle of the invention may be employed instead of those explained, change being made as regards the method or products herein disclosed, provided the steps or compounds stated by any of the following claims or the equivalent of such stated steps or compounds be employed.

We therefore particularly point out and distinctly claim as our invention:

1. An unsaturated ether having the general formula:

$$R—O—Y—O—Y'—OR'$$

wherein R and R' each represents a radical of the class consisting of allyl and 2-methyl-allyl radicals and Y and Y' each represents a lower alkylene radical.

2. An unsaturated ether having the general formula:

$$H_2C=CH—CH_2—O—Y—O—Y'—O—CH_2CH=CH_2$$

wherein Y and Y' each represents a lower alkylene radical.

3. An unsaturated ether having the general formula:

$$H_2C=\overset{CH_3}{\underset{|}{C}}-CH_2-O-Y-O-Y'-O-CH_2-\overset{CH_3}{\underset{|}{C}}=CH_2$$

wherein Y and Y' each represents a lower alkylene radical.

4. An unsaturated ether having the general formula:

$$R—O—CH_2CH_2—O—CH_2CH_2—O—R$$

wherein R represents a radical of the class consisting of allyl and 2-methyl-allyl radicals.

5. Di-allyloxy dimethyl ether, a compound which is liquid at room temperature, boils at a temperature of about 66° C. of 8 millimeters pressure, and has the formula:

$$H_2C=CH—CH_2—O—CH_2—O—CH_2—O—CH_2—CH=CH_2$$

6. Beta.beta'-di-allyloxy diethyl ether, a compound which is liquid at room temperature, boils at temperatures between about 96° and about 99° C. at 10 millimeters pressure, and has the formula:

$$H_2C=CH—CH_2—O—CH_2—CH_2—O—CH_2—CH_2—O—CH_2—CH=CH_2$$

7. Beta.beta'-di-(2-methyl allyloxy) diethyl ether, a compound which is liquid at room temperature, has a boiling point of approximately 234°—238° C. at atmospheric pressure, and has the formula:

$$H_2C=\overset{CH_3}{\underset{|}{C}}-CH_2-O-CH_2-CH_2-O-CH_2-CH_2-O-CH_2-\overset{CH_3}{\underset{|}{C}}=CH_2$$

8. In a method of making an ether having the general formula:

$$R—O—Y—O—Y'—O—R'$$

wherein R and R' each represents a radical of the class consisting of allyl and 2-methyl allyl radicals and Y and Y' each represents a lower alkylene radical, the step of reacting a metal salt of an alcohol selected from the class consisting of allyl alcohol and 2-methyl allyl alcohol with a di-haloalkyl ether.

9. In a method of making an ether having the general formula:

$$R—O—CH_2—O—CH_2—O—R$$

wherein R represents a radical of the class consisting of allyl and 2-methyl allyl radicals, the step of reacting an alkali metal salt of an alcohol selected from the class consisting of allyl alcohol and 2-methyl allyl alcohol with a di-halomethyl ether.

10. In a method of making an ether having the general formula:

$$R—O—CH_2CH_2—O—CH_2CH_2—O—R$$

wherein R represents a radical of the class consisting of allyl and 2-methyl allyl radicals, the step of reacting an alkali metal salt of an alcohol selected from the class consisting of allyl alcohol and 2-methyl allyl alcohol with a di-haloethyl ether.

11. In a method of making di-allyloxy di-methyl ether, the step of reacting sodium allylate with di-chloromethyl ether.

12. In a method of making beta.beta'-di-allyloxy diethyl ether, the step of reacting sodium allylate with beta.beta'-dichloro diethyl ether.

13. In a method of making beta.beta'-di-(2-methyl allyloxy) diethyl ether, the step of reacting sodium 2-methyl-allylate with beta.beta'-dichloro diethyl ether.

EDGAR C. BRITTON.
HAROLD R. SLAGH.